Dec. 31, 1940.  A. H. EMERY  2,226,756
DIAL INDICATOR GAUGE
Filed April 29, 1939  2 Sheets-Sheet 1
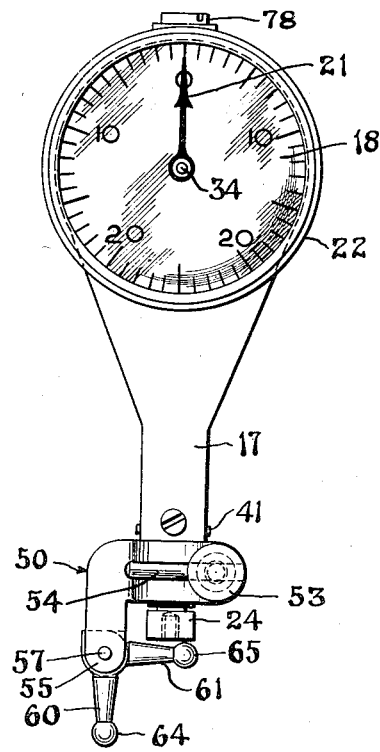
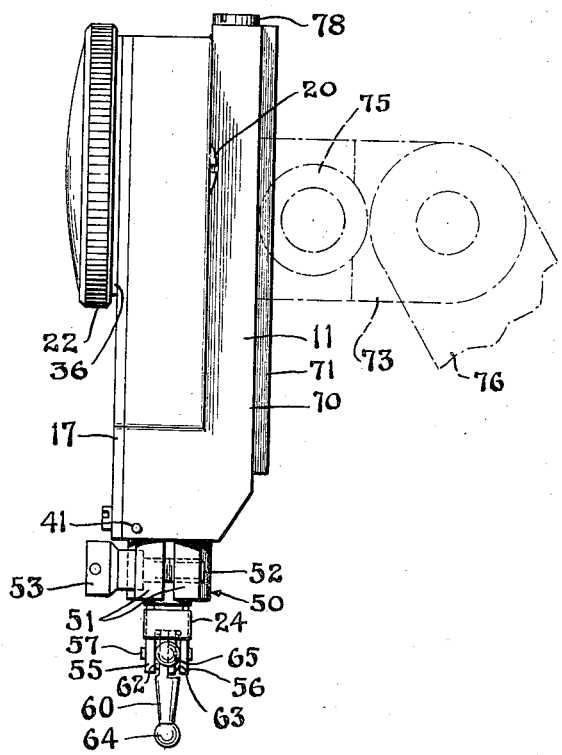
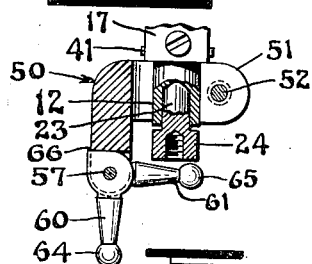
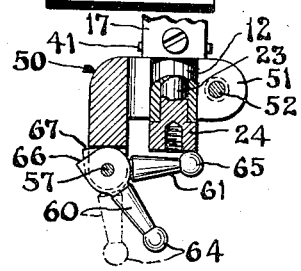
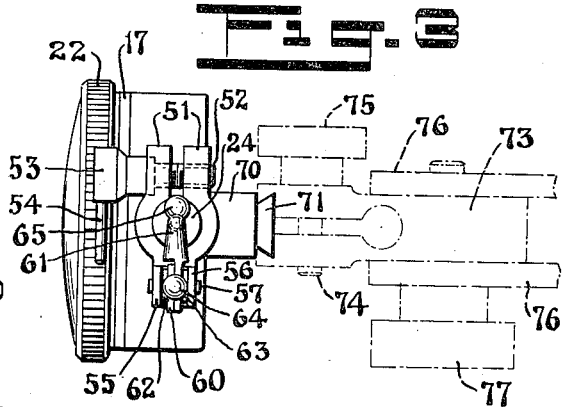
INVENTOR.
ALFRED H. EMERY
BY
Darby + Darby
ATTORNEYS Dec. 31, 1940. A. H. EMERY 2,226,756

DIAL INDICATOR GAUGE

Filed April 29, 1939 2 Sheets-Sheet 2

INVENTOR.
ALFRED H. EMERY
BY Darby & Darby
ATTORNEYS

Patented Dec. 31, 1940

2,226,756

UNITED STATES PATENT OFFICE 2,226,756

DIAL INDICATOR GAUGE

Alfred H. Emery, Poughkeepsie, N. Y., assignor to Standard Gage Company, Inc., Poughkeepsie, N. Y., a corporation of New York Application April 29, 1939, Serial No. 270,723

5 Claims. (Cl. 33—172)

The present invention relates to dial indicator gauges, and especially to dial indicator gauges of the gear driven type.

More particularly the invention relates to a dial indicator gauge of very small size adapted for use as a universal test indicator, that is to say, as an indicator which may be used in confined quarters and for measurements in connection with substantially any machine tool operation.

In the past gauges of the gear driven type have been so large that it was impossible to use a number of them to measure adjacent portions of a piece being machined. Furthermore, such gauges could not be used for many types of work because the gauge was adapted to measure only along the axis of the contact plunger. While small gauges have been made they were of the lever type which is inherently inaccurate and which never measures or gauges along the instrument axis.

This invention provides a gear driven dial indicator which may be used in the ordinary manner, i. e. to detect and measure differences in dimensions along the instrument axis, or which may be used to detect and measure differences in dimensions along lines lying in a plane at an angle to the axis of the instrument. Moreover the indicator is so constructed that the dial may always be readily visible.

It is an object of this invention to provide a gear driven dial indicator which is physically very small and which is nevertheless accurate and capable of indicating extremely minute variations.

Another object of the invention is to provide such an instrument which may be used in the ordinary manner to measure dimensions along a line parallel to the axis of the plunger and its contact point.

Another object of the invention is to provide a gear driven dial indicator which may be utilized for indicating differences in dimensions along lines at angles to the axis of the rack plunger with an accuracy equal to that secured when used to indicate such dimensional differences along the axis of the plunger.

A further object of the invention is to provide a means whereby the possibility of breakage of the instrument due to movement in excess of the range of the instrument may be avoided.

A further object of the invention is to provide such a means which at the same time makes it possible to so position the indicator that the dial is readily visible.

A still further object of the invention is to provide such a means for preventing breakage which will not interfere with the accuracy of the instrument.

Further objects and features of the invention will appear from the following description when considered in connection with the annexed drawings, in which Figure 1 is an enlarged front view of the dial indicator gauge of the present invention showing the mechanism for converting movement in a plane at right angles to the plunger axis to movement in the plane of the plunger axis. This mechanism is shown in place on the stem of the instrument. This view is approximately double the size of the central instrument;

Figure 2 is a side view of the instrument of Figure 1;

Figure 3 is a bottom view of the instrument of Figures 1 and 2. This figure also shows means for mounting the instrument;

Figure 4 is a detail cross-sectional view of the stem portion of the dial indicator gauge of Figure 1 showing the details of the mechanism for converting movement in a plane substantially perpendicular to the axis of the plunger to movement in a plane parallel to that axis;

Figure 5 is a view generally similar to Figure 4 showing particularly, however, how the movement converting mechanism is constructed to prevent damage to the instrument;

Figure 6:
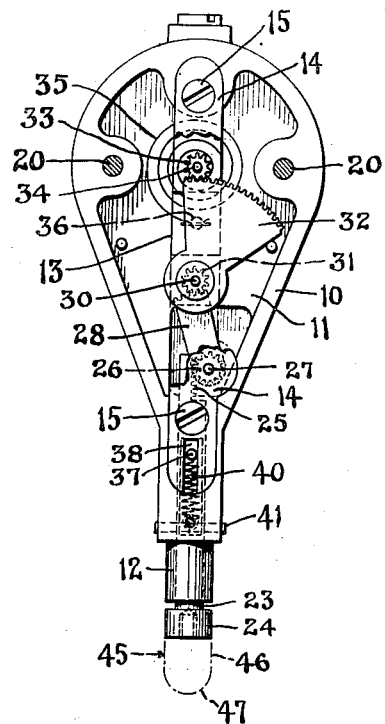

Figure 6 is a front view of the dial indicator gauge of Figure 1 with the dial and cover plate removed. This view shows the arrangement of the gears and other parts of the indicator and the mode of supporting the various shafts. In this figure the motion converting means has been replaced by the ordinary contact point.

Figure 7:
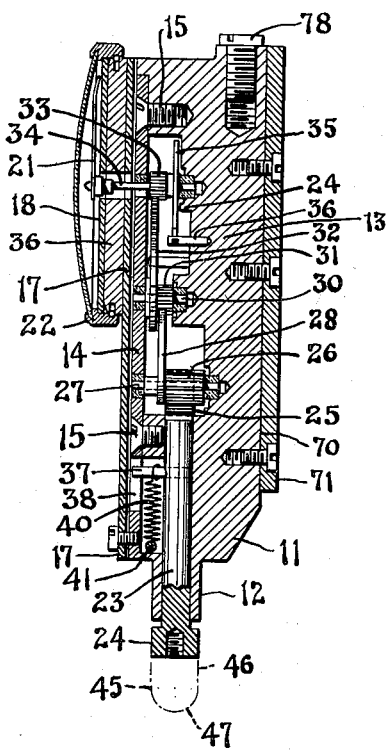
Figure 8:
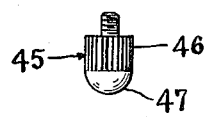

Figure 7 is a vertical, cross-sectional view of the instrument of Figure 6 taken on the plane of the line 7—7 of Figure 6; and Figure 8 is a detail view showing one form of removable contact point which may be used.

Referring particularly to Figures 6 and 7, it will be seen that the various parts of the indicator of this invention are in a housing which comprises a hollowed-out body member 11 having an upstanding rim 10, the two sides of rim 10 converging at the lower end to form the tubular stem 12. A central raised rib 13 extends longitudinally of the housing. This rib has the contour shown in Figure 7 and is drilled at various points to permit insertion of jewels which support one end of each of the various gear carrying shafts. The other ends of the shafts are rotatably supported in jewels inserted in a bar 14 which bar extends lengthwise of the body of the instrument and is supported at its upper end on a boss formed in the body 11 and at its lower end by the upstanding rim 10 at the point where the two sides thereof converge. This bar is fastened to the body 11 by means of screws 15.

A cover plate 16 having the shape of the rim 10 fits over the body 11 and is held against the rim 10 by means of a screw inserted through the cover plate and threaded into the body 11 near the lower end thereof. The plate is also held in place at the top by means hereinafter described. As may be seen by reference to Figure 7, the cover plate has a groove in its rear surface along its longitudinal axis to provide clearance for the various shafts.

A dial supporting member or disc 17 is supported on the plate 14 and in turn supports a graduated dial 18 on its outer surface. This disc together with the cover plate 14 is fastened to the body 11 by means of screws 20 passing through the bosses of body 11 and through plate 14 and threaded into member 18. The indicator hand 21 cooperates with this dial in the usual manner, the dial being held in position by the bezel 22 which supports a glass face as is customary in devices of this character.

The tubular stem 12 forms a bearing for the rack plunger 23 which plunger carries a contact piece 24 at its lower end. This contact piece is ground to an absolutely flat surface for a purpose to be hereinafter described.

At its inner end the plunger 23 has formed thereon the rack teeth 25 (see Figures 6 and 7) which mesh with the teeth of the gear 26 supported on shaft 27. Mounted on this same shaft is a gear sector 28 which extends upwardly as shown in Figures 6 and 7 and meshes with a pinion 30 fixed to rotate on shaft 31. Likewise fixed to this shaft is a gear sector 32 which extends upwardly as seen in Figures 6 and 7, and meshes with the gear 33 mounted on the shaft 34 on which the pointer or hand 21 is mounted. Also mounted on the shaft 34 is a spiral spring 35 the free end of which extends to a stud 36 mounted in the indicator body 11. This spring serves in the usual manner to prevent backlash in the gear train.

Inserted in the plunger 23, below the teeth 25, is a pin 37 which pin extends outwardly toward the cover plate 14 and is guided in a slot 38 formed in that plate. The pin and slot arrangement serves to prevent rotation of the rack 23 in the tubular extension 12. This pin likewise serves to hold one end of a spring 40 which is stretched between the pin and a second pin 41. Pin 33 is inserted in a hole in the body member 11 and extends from one side to the other thereof just above the tubular stem 12, as is best shown in Figures 6 and 7.

It will be seen from the above that when the plunger 23 is moved this movement is transmitted through the various gears and gear sectors hereinabove described to the pointer or hand 21 which is then rotated over the graduated dial to indicate the amount of movement thereof.

It is customary and in fact essential that the point which makes contact with the work to be measured be spherical in form so that the fact that the axis of the rack plunger is not exactly at right angles to the surface being measured will not affect the reading. For this reason the shouldered end 24 of the rack plunger is drilled and tapped so that a contact point 45 (see Figure 8) may be screwed into the plunger, this contact being provided with a knurled surface 46 to make its insertion easy and provided with a spherical surface 47 which is the actual contact point.

An instrument such as has been described above is the usual form of dial indicator gauge but is not adaptable to many measuring or gauging operations since as has been indicated the plunger or rack 13 must be at least substantially perpendicular to the surface to be gauged.

In order that this instrument may be used universally it is provided with a motion converting device which is shown particularly in Figures 1 through 5 and which will now be described. This motion converting device, generally designated 50 comprises a split clamp 51 which may be placed upon the stem 12 of the indicator and clamped thereto by means of the screw 52 extending through one extremity thereof. This screw is provided with a head 53 of the usual type and in addition has a capstan bar 54 to facilitate tightening thereof. As is obvious the member 50 may be rotated about stem 12 and clamped in any desirable position.

The device 50 has a portion which extends at right angles to the clamp 51, which portion at its lower end, is bifurcated forming the two extensions 55 and 56 in which a shaft 57 is mounted. Rotatably mounted on the shaft 46 are the two arms 60 and 61 which together form a bell crank. Arms 60 and 61 make frictional engagement with each other throughout the area adjacent to the shaft 47 and are held in such frictional engagement by the friction washers 62 and 63.

Each of the arms 60 and 61 is provided at its outer extremity with a spherical member 64 or 65, one of which normally bears against the end 24 of the rack plunger and the other of which 64 is the contact point used for gauging. Due to this frictional engagement between the two arms, it will be seen that if the gauging contact 64 is brought into contact with a portion of the work to be gauged, which lies outside of the working limits of the indicator, the arm 60 will move independently of arm 61 and no damage will be done to the delicate mechanism of the gauge itself.

This frictional engagement of two arms is not uncommon, but in the past the two arms had no definite relationship to each other and were not restored to an exact right angle relationship after having been moved independently as mentioned above.

As will be readily seen by reference to Figure 5, if the bell crank composed of the arms 60 and 61 or similar members should be utilized to perform a gauging operation after having been broken and set in a position such as that shown in dotted lines in Figure 5, the component of motion which would be transmitted to the gauge and indicated thereby would be solely that in a horizontal direction, the proportion of the force exerted in the vertical direction being ineffective. For this reason the indication of the gauge would be inaccurate and in order to obviate this difficulty there has been provided on each of the arms 60 and 61 a flat surface 66 and 67 which cooperates with the flat surface at the base of the bifurcation of the member 50, forming stops against which the arms may be set to ensure that prior to any gauging operation they will be placed in the correct right angle relationship with each other.

For purposes of mounting this indicator gauge, a rib 70 is formed integrally with the body member 11, this rib 70 having fastened thereto a member 71 which is so formed that it together with rib 70 forms a dovetail. This dovetail may be utilized in a well known manner for clamping the instrument to a mating member having a similar dovetail. Such a mating member is shown in Figures 2 and 3 and comprises for example a mounting lug 73 having the mating dovetail formed in the split ends thereof, the extremities of the clamp being fastened together by means of the screw 74 having the usual knurled head 75. The lug 73 may have a hole at its other extremity, which other extremity may be fastened in the usual mounting member of any of the standard forms of dial gauge mounting. In Figures 2 and 3 the lug is shown fastened to the bifurcated piece 76 by means of the screw 77.

It might be mentioned at this point that there is provided a further form of mounting, not shown in the drawings, which consists of a stud which may replace the screw 78 inserted in the upper portion of the body 11 of the instrument, as shown in Figure 7.

While I have described a preferred embodiment of my invention it is understood that other forms thereof may be substituted therefor and consequently I do not wish to be limited by the foregoing description but on the contrary prefer that the scope of my invention be determined solely by the appended claims.

What is claimed is:

1. In a motion converting means for attachment to the stem of a dial indicator gauge, the combination of a bellcrank comprising a pair of arms, means for holding said arms in frictional engagement, means for mounting said arms on the stem of the gauge, and means on said mounting means and cooperating with said arms for limiting the movement of said arms in one direction whereby they may be placed in precise right angle relationship after movement therefrom.

2. In a motion converting means for attachment to the stem of a dial indicator gauge, the combination of a bellcrank comprising a pair of arms, means for holding said arms in frictional engagement, means for mounting said arms on the stem of the gauge, said means being clampable on said stem in any desired angular position with respect to the axis thereof, and means on said mounting means and cooperating with said arms for limiting the movement of said arms in one direction whereby they may be placed in precise right angle relationship after movement therefrom.

3. In a motion converting means for attachment to the stem of a dial indicator gauge, the combination of a bellcrank comprising a pair of arms, means for holding said arms in frictional engagement, means for mounting said arms on the stem of the gauge, and means for limiting the movement of said arms in one direction whereby they may be placed in precise right angle relationship after movement therefrom, said last mentioned means including stops on said arms cooperating with said mounting means.

4. As an attachment for a dial indicator having a contact plunger and a tubular stem in which said plunger is reciprocable, a motion converting means rotatably mounted on said stem, said means comprising a bifurcated arm clamped to said stem, a bellcrank lever comprising two arms mounted between said bifurcations, means for holding said two arms in frictional engagement, and means for limiting the setting movement of said arms whereby they may be restored to precise right angle relationship after movement therefrom.

5. As an attachment for a dial indicator having a contact plunger and a tubular stem in which said plunger is reciprocable, a motion converting means rotatably mounted on said stem, said means comprising a bifurcated arm clamped to said stem, a bell crank lever comprising two arms mounted between said bifurcations, means for holding said two arms in frictional engagement, and means to assure restoration to said arms to precise right angle relationship after movement therefrom, said last mentioned means including stops on said arms cooperating with the base portions of said bifurcations.

ALFRED H. EMERY.